(12) United States Patent
Ogawa et al.

(10) Patent No.: US 8,810,445 B2
(45) Date of Patent: Aug. 19, 2014

(54) METHOD AND APPARATUS FOR RECOGNIZING PRESENCE OF OBJECTS

(75) Inventors: Takashi Ogawa, Nagoya (JP); Hiroshi Sakai, Mizuho (JP)

(73) Assignee: DENSO CORPORATION, Kariya (JP)

( * ) Notice: Subject to any disclaimer, the term of this patent is extended or adjusted under 35 U.S.C. 154(b) by 585 days.

(21) Appl. No.: 13/093,904

(22) Filed: Apr. 26, 2011

(65) Prior Publication Data

US 2011/0260909 A1 Oct. 27, 2011

(30) Foreign Application Priority Data

Apr. 27, 2010 (JP) ................................ 2010-102186

(51) Int. Cl.
*G01S 13/00* (2006.01)

(52) U.S. Cl.
USPC .......................................... 342/70; 342/107

(58) Field of Classification Search
USPC ..................................................... 342/70–72
See application file for complete search history.

(56) References Cited

U.S. PATENT DOCUMENTS

| | | | |
|---|---|---|---|
| 2002/0003489 A1* | 1/2002 | Samukawa et al. ............. | 342/70 |
| 2004/0022416 A1* | 2/2004 | Lemelson et al. ............ | 382/104 |
| 2004/0176900 A1* | 9/2004 | Yajima ............................ | 701/96 |
| 2005/0231339 A1* | 10/2005 | Kudo ............................. | 340/435 |
| 2005/0243301 A1* | 11/2005 | Takagi ......................... | 356/4.07 |
| 2009/0184845 A1* | 7/2009 | Saito ............................. | 340/937 |

FOREIGN PATENT DOCUMENTS

| | | |
|---|---|---|
| JP | A-2004-053278 | 2/2004 |
| JP | A-2004-265238 | 9/2004 |
| JP | A-2009-282592 | 12/2009 |

OTHER PUBLICATIONS

Office Action mailed Apr. 24, 2012 in corresponding JP Application No. 2010-102186 (and English translation).

* cited by examiner

*Primary Examiner* — Timothy A Brainard
(74) *Attorney, Agent, or Firm* — Posz Law Group, PLC (57) ABSTRACT

An object recognition apparatus is provided, which enhances accuracy in recognizing more than one object to be detected closely located along a scan direction. In the apparatus, measured-distance datums included in an area formed by those measured-distance datums which are spaced apart by a distance of not more than a predetermined allowable value are grouped as one candidate area. The candidate area, if it has a size larger than a specified value, is regarded as a special candidate area. An object area on an image datum corresponding to the special candidate area is subjected to an image recognition process to define the range of the objects residing therein. The special candidate area is divided at a border between the objects based on the defined range. All candidate areas including the divided new candidate areas are subjected to a tracing process to confirm an object in each candidate area.

18 Claims, 7 Drawing Sheets

IMAGE DATUM          OBJECT AREA

FIG.3B

IMAGE DATUM   DETECTION   DETECTION
              OBJECT      OBJECT
              A           B

METHOD AND APPARATUS FOR RECOGNIZING PRESENCE OF OBJECTS

CROSS-REFERENCE TO RELATED APPLICATION

This application is based on and claims the benefit of priority from earlier Japanese Patent Application No. 2010-102186 filed Apr. 27, 2010, the description of which is incorporated herein by reference.

BACKGROUND OF THE INVENTION

1. Technical Field of the Invention

The present invention relates to a method and apparatus for recognizing presence of objects from the detection results obtained from a laser radar system, and in particular, the method and apparatus preferably applied to vehicles.

2. Related Art

Object recognition apparatus have been known. For example, in a known object recognition apparatus, an object (mainly, a preceding vehicle) residing in the forward direction of the vehicle concerned is recognized to perform a vehicle control, such as an adaptive cruise control (ACC) or a control based on a pre-crash safety system (PCS).

For example, JP-A-2004-053278 discloses this type of object recognition apparatus. This object recognition apparatus includes a laser radar system and an imaging unit. The laser radar system sequentially emits laser beams (i.e. probe waves) along a predetermined scan direction so that the beams are adjacently juxtaposed. Then, an object as an object to be detected is recognized based on the results of the emission of the laser beams. Meanwhile, the imaging unit picks up an image that includes, as an imaging range, at least a scan area of the laser beams. Then, the picked up image is subjected to an image recognition process so that an object to be detected is recognized. In such an object recognition apparatus, the location of the object to be detected, which has been recognized by each of the laser radar system and the imaging unit is traced in a time-series manner.

In the object recognition apparatus, the laser radar system (hereinafter referred to as "conventional radar system") generates a measured-distance datum every time a laser beam is emitted, based on a reflected wave from an object, which wave is obtained as a result of the emission of the laser beam. The measured-distance datum includes the location of the object (i.e. a distance from the laser radar system to the object, a coordinate in the widthwise direction of the vehicle, and a coordinate in the heightwise direction of the vehicle).

The location of the object may be different between measured-distance datums. Those measured-distance datums forming an area and having the above difference of not more than a preset allowable value are grouped as belonging to the same group. Then, the location of the grouped measured-distance datums, or a group of measured-distance datums, is traced in a time-series manner to recognize an object to be detected. This is the generally performed process of object recognition.

Figures 7A, 7B:
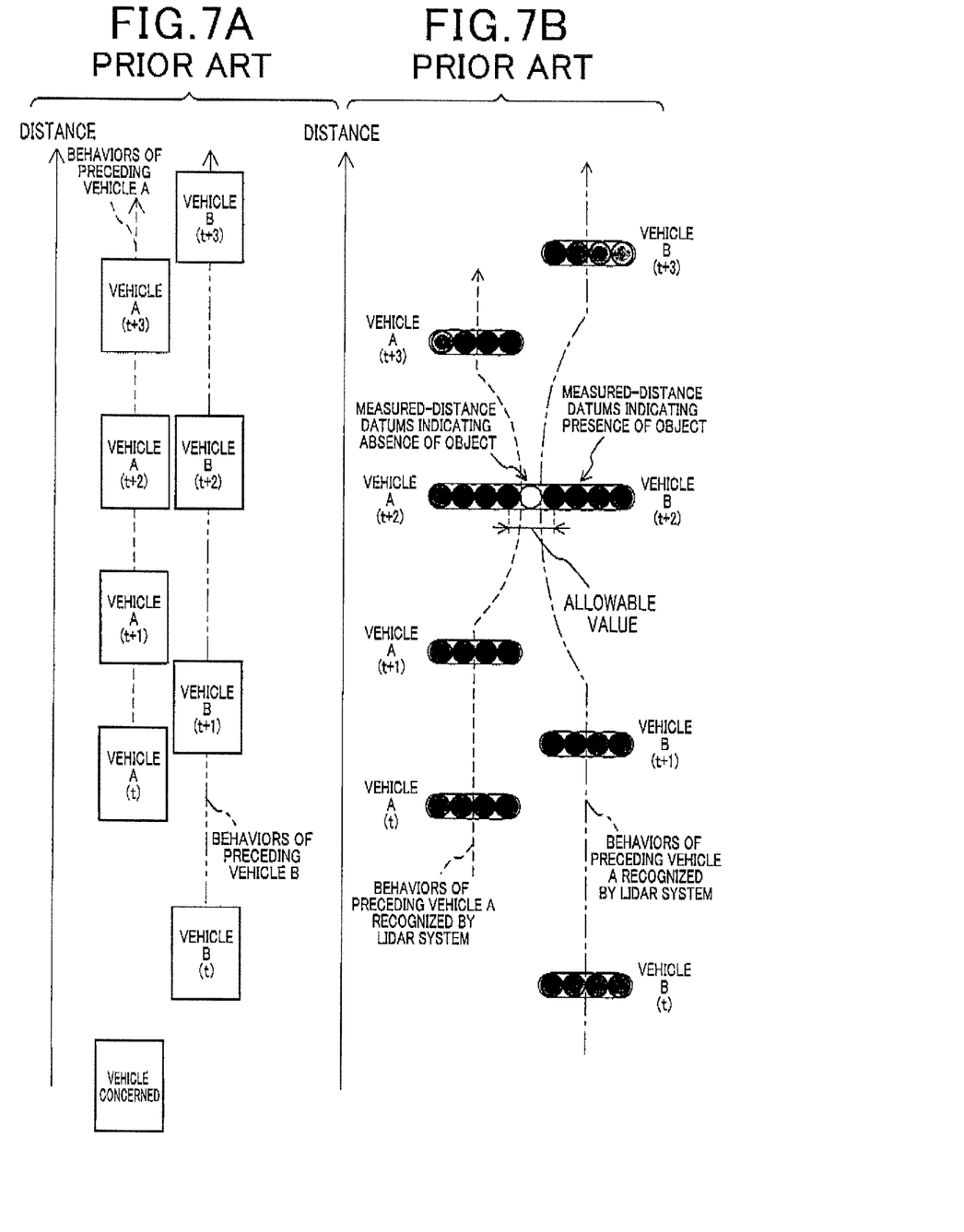
FIGS. 7A and 7B are explanatory diagrams illustrating drawbacks of a radar system according to conventional art.

FIG. 7A is a diagram illustrating the travel conditions of vehicles A and B traveling on a road in the forward direction of the vehicle concerned. FIG. 7B is a diagram illustrating the states of measured-distance datums that have been recognized as being the vehicles A and B by the conventional radar system under the travel conditions illustrated in FIG. 7A.

As shown in FIG. 7A, the vehicle B traveling from behind the vehicle A at time t approaches the vehicle A at time t+1. Then, at time t+2, the vehicle B, with its end portion (left end) approaching an end portion (right end) of the vehicle A, eventually travels side by side with the vehicle A. Then, at time t+3, the vehicle B travels ahead of the vehicle A.

At times t, t+1 and t+3 under such conditions, the difference between the measured-distance datum corresponding to the end portion (right end) of the vehicle A and the measured-distance datum corresponding to the end portion (left end) of the vehicle B is larger than an allowable value. Therefore, as shown in FIG. 7B, the conventional radar system separately groups the measured-distance datums corresponding to the vehicle A and the measured-distance datums corresponding to the vehicle B to individually recognize the vehicles A and B.

On the other hand, at time t+2, the distance from the conventional radar system to the vehicle A is equal to the distance to the vehicle B. Also, since the vehicle B has approached the vehicle A, the distance between the end portion (right end) of the vehicle A and the end portion (left end) of the vehicle B becomes small in the widthwise direction of the vehicle (hereinafter just referred to as "widthwise direction").

Meanwhile, a laser beam emitted from the conventional radar system is scattered as the distance after the emission becomes longer, allowing the beam width to be larger. Therefore, the laser beam emitted toward the space between the vehicles A and B may not pass through the space between the vehicles A and B but may be reflected by the vehicle A or the vehicle B. In such a case, in the conventional radar system, the difference between the measured-distance datum detected as the end portion (right end) of the vehicle A and the measured-distance datum detected as the end portion of the vehicle B becomes equal to or less than the allowable value. As a result, the measured-distance datums of the vehicles A and B are grouped as a single object (i.e. a single vehicle). This raises a problem that the two vehicles A and B are erroneously recognized as a single object.

Moreover, in the time-series tracing of the locations of the vehicles A and B using the conventional radar system, the tracing is kept with the vehicles A and B being erroneously recognized. Therefore, there has been a problem that, at time t+2, the behaviors of the erroneously recognized vehicle as an object are regarded as skidding, or the size of the vehicle as an object is recognized as having become suddenly large.

In other words, the conventional radar system has suffered a problem that, when more than one object to be detected is closely located along the scan direction, the individual objects to be detected cannot be recognized with good accuracy.

SUMMARY

Hence, it is desired to provide an object recognition apparatus which is able to improve the accuracy of recognition (or estimation) of more than one object to be detected even when the objects are closely located in the scan direction.

The object recognition apparatus recognizes (or estimate) the presence of an object to be detected based on the results of sequentially emitting probe waves along a predetermined scan direction so that the probe waves are adjacently juxtaposed.

In the apparatus, location acquiring means acquires a measured-distance datum indicating the location of an object, the measured-distance datum being generated for each emission of the probe wave based on a reflected wave from the object, the reflected wave being obtained as a result of emitting the probe wave.

Also, in the apparatus, image acquiring means acquires an image datum that is an image of an area including a scan area of the probe waves.

In the apparatus, candidate detecting means detects a candidate area in which measured-distance datums are grouped as belonging to the same group, based on the measured-distance datums acquired by the location acquiring means, the grouped measured-distance datums being included in an area formed by those measured-distance datums which are spaced apart by a distance of not more than a predetermined allowable value.

Also, in the apparatus, special candidate area determining means determines a special candidate area in the candidate area detected by the candidate detecting means, the special candidate area having a probability of including at least two or more objects to be detected which are adjacently located along a predetermined direction.

In the apparatus, range detecting means recognizes an object by subjecting the image datum acquired by the image acquiring means to an image recognition process and detects a range of measured-distance datums in which the objects to be detected reside, the objects being imaged in an area on the image datum, the area corresponding to the special candidate area.

In the apparatus, candidate dividing means divides the special candidate area at a border position between objects, the border position corresponding to an end of the range of the measured-distance datums detected by the range detecting means.

According to the object recognition apparatus, when the candidate area corresponds to the special candidate area, the special candidate area is divided into areas corresponding to individual objects based on the range of the measured-distance datums detected from the image datum.

Thus, according to the object recognition apparatus, under the condition where more than one object to be detected (hereinafter also referred to as "detection objects") is adjacently present along the scan direction, all of the detection objects can be recognized as individual detection objects, whereby the accuracy of detecting detection objects is enhanced.

Further, according to the object recognition apparatus, high-accuracy recognition can be performed regarding the time-series change of the location of each recognized detection object, i.e. regarding the behaviors of each detection object.

It should be appreciated that, in the object recognition apparatus, the, candidate dividing means may divide a candidate area into divisions. Then, the location of each division as a candidate area may be traced in a time-series manner, so that the object recognizing means can recognize a detection object from the results of the time-series tracing.

In the present configuration, the range detecting means may perform the image recognition process for an area in the image datum, the area corresponding to the special candidate area According to the object recognition apparatus, the area in an image datum subjected to the image recognition process is limited to the area corresponding to the special candidate area. Accordingly, the amount of processing is reduced which is required for detecting the range of measured-distance datums in an image datum. Thus, according to the object recognition apparatus, the time taken for detecting the range of measured-distance datums is shortened.

In the present configuration, the range detecting means may determine the candidate area as being the special candidate area if the candidate area has a size larger than a specified value that indicates the is size of a unit body of each of the objects to be detected.

According to the object recognition apparatus, an area having a high possibility of including more than one detection object is defined as a special candidate area. As a result, according to the object recognition apparatus, erroneous recognition of more than one object as being a single object (detection object) is more reliably prevented.

The object recognition apparatus may include re-detecting means that allows the range detecting means to detect a range of the measured-distance datums, using the group of measured-distance datums as the special candidate area, if the group of measured-distance datums has a size larger than the specified value, the group of measured-distance datums resulting from the division performed by the candidate dividing means.

According to the object recognition apparatus, all the detection objects included in a special candidate area can be more reliably recognized as being individual detection objects.

The object recognition apparatus may emit the probe waves using at least a vehicle's widthwise direction as one of the scan directions. In this case, the range detecting means may define the special candidate area in which the vehicle's widthwise direction is used as the predetermined direction.

In an object recognition apparatus, more than one detection objects may be adjacently located in the widthwise direction of the vehicle, such as when more than one closely located preceding vehicle is traveling side by side. According to the object recognition apparatus, erroneous recognition of detection objects as being a single object (detection object) is prevented in the case where the detection objects are adjacently located in widthwise direction.

The object recognition apparatus may emit the probe waves using at least a vehicle's heightwise direction as one of the scan directions. In this case, the range detecting means may define the special candidate area in which the vehicle's heightwise direction is used as the predetermined direction.

In an object recognition apparatus, more than one object may be adjacently located in the heightwise direction of the vehicle, such as when there is a stopped vehicle and a traffic sign is located above the stopped vehicle. According to the object recognition apparatus, erroneous recognition of detection objects as being a single object (detection object) is prevented in the case where the detection objects are adjacently located in heightwise direction.

The present configuration may be configures as a program for allowing a computer to function as an object recognition apparatus.

In this case, the computer is required to perform a location acquiring procedure that acquires a measured-distance datum indicating the location of an object, the measured-distance datum being generated for each emission of the probe wave based on a reflected wave from the object, the reflected wave being obtained as a result of emitting the probe wave; an image acquiring procedure that acquires an image datum that is an image of an area at least including a scan area of the probe waves; a candidate detecting procedure that detects a candidate area in which measured-distance datums are grouped as belonging to the same group, based on the measured-distance datums acquired by the location acquiring procedure, the grouped measured-distance datums being included in an area formed by those measured-distance datums which are spaced apart by a distance of not more than a predetermined allowable value; a special candidate area determining procedure that determines a special candidate area in the candidate area detected by the candidate detecting procedure, the special candidate area having a probability of including at least two or more objects to be detected which are adjacently located along a predetermined direction; a range detecting procedure that recognizes an object by subjecting the image datum acquired by the image acquiring procedure to an image recognition process and detects a range of measured-distance datums in which the objects to be detected reside, the objects being imaged in an area on the image datum, the area corresponding to the special candidate area; and a candidate dividing procedure that divides the special candidate area at a border position between objects, the border position corresponding to an end of the range of the measured-distance datums detected by the range detecting procedure.

A program having such a configuration may be recorded on a computer-readable recording medium, such as DVD-ROM, CD-ROM or a hard disc. Thus, the program may be loaded on a computer and started as required, or may be acquired by a computer via a communication line and started as required. When the individual steps are performed by a computer, the computer can function as the object recognition apparatus as set forth above.

DETAILED DESCRIPTION OF THE PREFERRED EMBODIMENTS

With reference to FIGS. 1 to 4A-4C, hereinafter is described an embodiment of the present invention.

Figure 1:
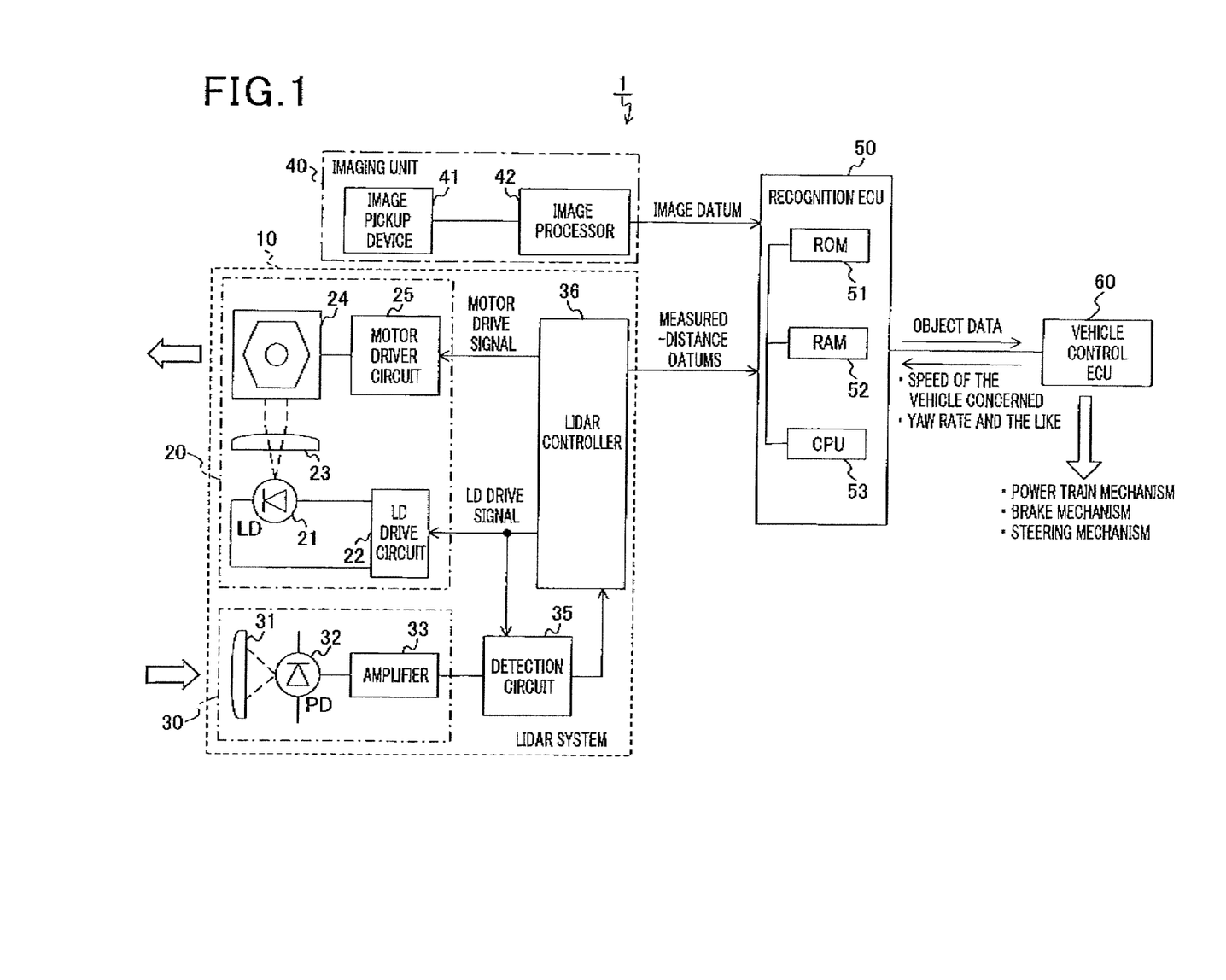
FIG. 1 is a schematic block diagram illustrating the configuration of an object recognition system including a recognition ECU to which the present invention is applied, and a peripheral configuration of the system, according to an embodiment of the present invention.

FIG. 1 is a schematic block diagram illustrating the configuration of an object recognition system 1 including a recognition ECU (electronic control unit) 50 to which the present invention is applied, and a peripheral configuration of the object recognition system 1.

The object recognition system 1 is used being installed in a vehicle. The object recognition system 1 recognizes (or estimates) the presence of an object residing in a forward direction of the vehicle concerned and generates object data (or target data) that is the information associated with the recognized object. The generated object data includes the type of the object (e.g., preceding vehicle or road traffic sign), the location of the object (distance from the vehicle concerned to the object, coordinate in the vehicle's widthwise direction, and coordinate in the vehicle's heightwise direction), the size of the object, and the relative speed between the object and the vehicle (or the speed of the object). The object data is supplied to a vehicle-control electronic control unit (hereinafter referred to as "vehicle control ECU") 60.

Then, the vehicle control ECU 60 performs well-known vehicle controls, such as adaptive cruise control (ACC) based on the object data. For example, in ACC, the control ECU 60 controls the power train mechanism, the brake mechanism and the steering mechanism installed in the vehicle, so that the vehicle can follow the behaviors of the preceding vehicle while maintaining the intervehicle distance at a predetermined level.

Specifically, the object recognition system 1 includes a lidar (LIDAR; Light Detection And Ranging) system 10, an imaging unit 40 and a recognition electronic control unit (hereinafter referred to as "recognition ECU") 50.

The lidar system 10 includes a light emitter 20 and a light receiver 30. The light emitter 20 scans the forward direction of the vehicle using laser beams as probe waves. The light receiver 30 receives reflected light (reflected waves) from an object, the reflected light corresponding to the laser beam emitted from the light emitter 20 and reflected by the object.

The lidar system 10 also includes a detection circuit 35 and a lidar controller 36. The detection circuit 35 measures the time from when a laser beam is emitted from the light emitter 20 until when reflected light is received by the light receiver 30 to generate a distance datum R. The lidar controller 36 outputs an LD drive signal for driving the light emitter 20 and generates a measured-distance datum based on the distance datum R generated by the detection circuit 35.

For example, the lidar system 10 is attached to the vicinity of the front bumper/grille outside the vehicle compartment or to the vicinity of the rearview mirror in the vehicle compartment, which is a position from where laser beams can be emitted toward the forward direction of the vehicle.

The light emitter 20 includes a laser diode (LD) 21 and an LD drive circuit 22. The LD 21 generates a laser beam. The LD drive circuit 22 permits the LD 21 to generate a pulsed laser beam in response to an LD drive signal from the lidar controller 36.

The light emitter 20 also includes a light-emitting lens 23, a scanner mechanism 24 and a motor drive circuit 25. The light-emitting lens 23 narrows the width of the laser beam generated by the LD 21. The scanner mechanism 24 is configured by a rotating polygon mirror having sides with different slant angle for reflecting the laser beams supplied via the light-emitting lens 23, and a motor for driving the rotating polygon mirror. The motor drive circuit 25 drives the motor configuring the scanner mechanism 24 in response to a motor drive signal from the lidar controller 36 to realize scan with the laser beams within a preset angular range.

The scan with the laser beams emitted from the light emitter 20 is realized as set forth below. Specifically, a scan area is defined by an angular range (e.g., ±18.0 deg) preset in the widthwise direction of the vehicle (hereinafter just referred to as "widthwise direction") centering on the front direction (0 deg) of the vehicle. Laser beams are emitted by displacing the direction of emission along the widthwise direction on a predetermined-angle basis (e.g. on the basis of an angle equal to the width of a laser beam (0.25 deg)) over the scan area. Hereinafter, the one-dimensional beam scan in the widthwise direction is referred to as "line scan".

After completing one line scan, the motor drive circuit 25 sequentially switches a depression angle θy of the laser beams in the heightwise direction of the vehicle (hereinafter just referred to as "heightwise direction"). By repeating the line scan while the depression angle is sequentially switched, two-dimensional beam scan is realized.

The light receiver 30 includes a light-receiving lens 31, a light-receiving element (PD) 32 and an amplifier 33. The light-receiving lens 31 receives reflected light from an object, which corresponds to the reflection of a laser beam from the object. The light-receiving element 32 receives the reflected light via the light-receiving lens 31 and generates a light-receiving signal having a voltage value corresponding to the intensity of the received reflected light. The amplifier 33 amplifies the light-receiving signal from the light-receiving element 32.

The detection circuit 35 receives the LD drive signals from the lidar controller 36. Every time an LD drive signal is received, the detection circuit 35 measures the phase difference (i.e. a round-trip time of a laser beam to/from an object that has reflected the laser beam) between the LD drive signal and a light-receiving signal from the light-receiver 30. Then, the detection circuit 35 generates the distance datum R by calculating the measurement results in terms of the distance up to the object that has reflected the laser beam.

The lidar controller 36 is configured by a well-known microcomputer including a CPU, a ROM and a RAM.

The lidar controller 36 drives the light emitter 20 using the LD drive signal and the motor drive signal to perform a scan process by which two-dimensional beam scan is realized. The scan process is started with every preset scan cycle. In the scan process, the LD drive signal and the motor drive signal are outputted, so that the line scan with the beams having a different depression angle θy is repeated by the number of times equal to the number of varieties of the depression angle θy.

Then, the distance datum R is correlated to a scan angle θx, y (i.e. correlated to the position of the LD drive signal in a sequence in one line scan) of the time point when the distance datum R has been generated. The lidar controller 36 stores the correlated distance datums R as measured-distance datums (R, θx, y) on a scan-by-scan basis of a different beam depression angle θy. Thus, each measured-distance datum (R, θx, y) indicates the presence/absence of an object that has reflected the laser beam, the distance up to the object and the location of the object.

The lidar controller 36 is also configured to supply the stored measured-distance datums (R, θx, y) to the recognition ECU 50 upon request from the recognition ECU 50.

The imaging unit 40 includes an image pickup device 41 and an image processor 42. The image pickup device 41 picks up digital images (i.e, image datums). The image processor 42 stores the image datums picked up by the image pickup device 41 for supply to the recognition ECU 50 upon request from the recognition ECU 50.

The image pickup device 41 is fixed to a predetermined position so as to cover an imaging range that includes at least an emission range (i.e. scan area) of the laser beams emitted from the lidar system 10. The image pickup device 41 picks up an image at a periodic time interval which is substantially the same as the scan cycle to thereby produce image datums.

The image processor 42 is configured by a well-known microcomputer including a CPU, a ROM and a RAM.

The recognition ECU 50 is mainly configured by a well-known microcomputer at least including a ROM 51, a RAM 52 and a CPU 53. The ROM 51 stores data and a program whose contents are required to be retained in the event of power-down. The RAM 52 temporarily stores data. The CPU 53 performs a process according a program stored in the ROM 51 or the RAM 52.

The ROM 51 is provided with a program for the recognition ECU 50 to perform an object recognition process. In the object recognition process, an object residing in the forward direction (i.e. the front direction) of the vehicle is recognized based on the measured-distance datums (R, θx, y) acquired from the lidar system 10 and the image datums acquired from the imaging unit 40 to generate object data of the recognized object. In other words, the recognition ECU 50 functions as the object recognition apparatus of the present invention by performing the object recognition process.

Hereinafter is described the object recognition process performed by the recognition ECU 50.

Figure 2:
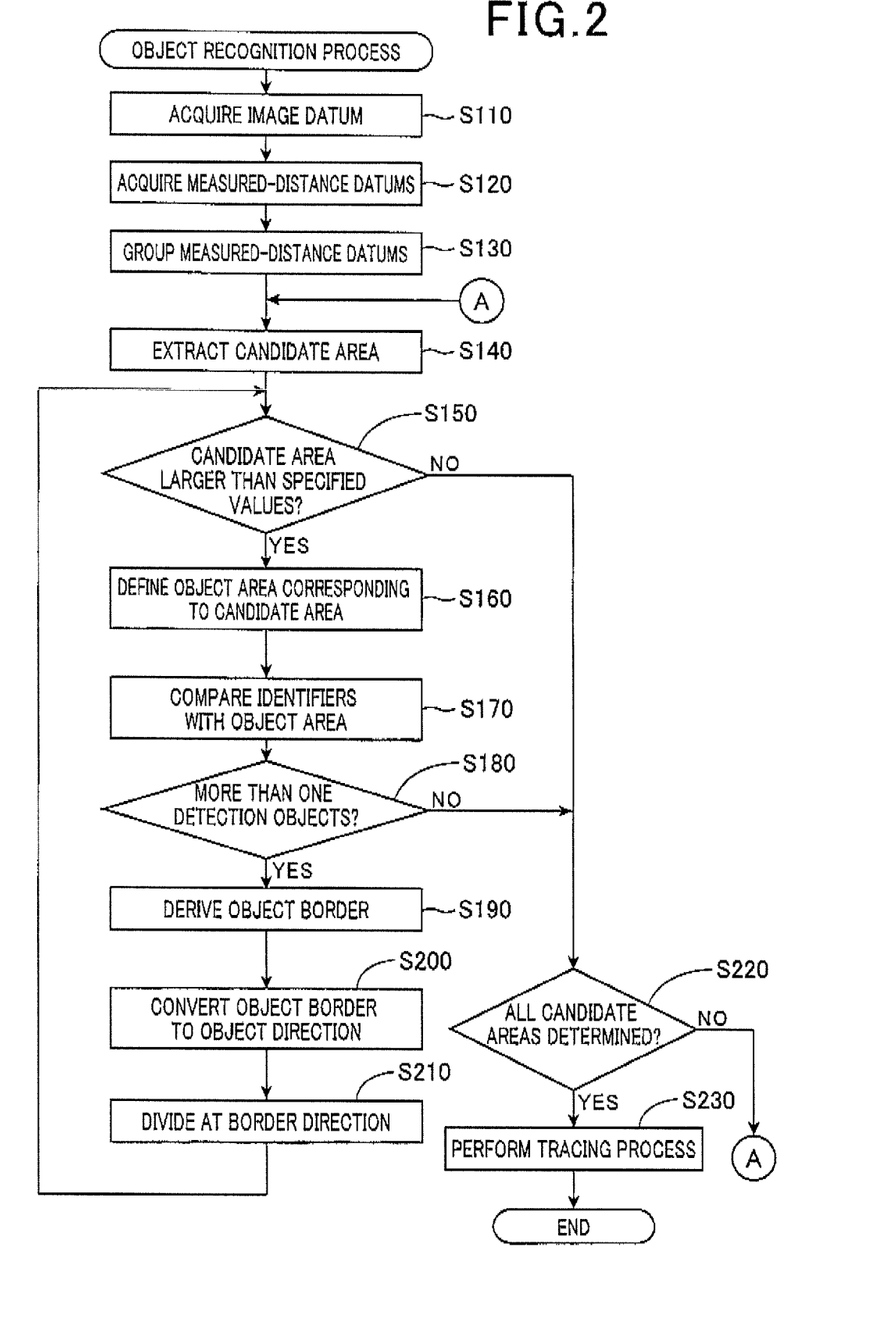
FIG. 2 is a flow diagram illustrating the processing procedure of an object recognition process performed by the recognition ECU.

The object recognition process is started every time the scan process is completed by the lidar system 10, i.e. started at every scan cycle. FIG. 2 is a flow diagram illustrating the object recognition process.

Specifically, in the object recognition process, the recognition ECU 50 acquires, first, the latest image datum in the time series from the image processor 42 of the imaging unit 40 (S110). Subsequently, the recognition ECU 50 acquires the measured-distance datums (R, θx, y) corresponding to one scan process from the lidar controller 36 of the lidar system 10 (S120).

Then, of the acquired measured-distance datums (R, θx, y), the measured-distance datums (R, θx, y) regarded as being belonging to the same group are grouped to form a segment (hereinafter referred to as "candidate area") (S130).

Specifically, at S130 of the present embodiment, a polar coordinate position (point), which is defined by a distant datum R and a scan angle θx, y forming each measured-distance datum (R, θx, y), is converted to an orthogonal coordinate position (point). It should be appreciated that, in the orthogonal coordinate, the origin (0, 0, 0) indicates the center of the vehicle concerned, the X axis indicates a widthwise direction, the Y axis indicates the heightwise direction, and the Z axis indicates the forward direction of the vehicle.

Of the positions (points) resulting from the conversion into the orthogonal coordinate system, those position (set of points (point set)) which meet all of the three conditions set forth below are grouped. The three conditions are: the distance in the X-axis direction is not more than a predetermined allowable value $\Delta x$ (e.g., 0.2 m); the distance in the Y-axis direction is not more than a predetermined allowable value $\Delta y$; and the distance in the Z-axis direction is not more than a predetermined allowable value $\Delta z$ (e.g., 2 m).

Each candidate area has a rectangular shape including a set of points integrated by the grouping, the rectangular shape being set to a size in conformity with the set of points. Each candidate area is correlated to segment data that includes three-side data (W (width), H (height) and D (depth)) indicating the size of the candidate area and includes a scan angle θx, y corresponding to the left end and the right end of the candidate area.

Specifically, each candidate area corresponds to a group of measured-distance datums (R, θx, y) having differences therebetween in the X-, Y- and Z-axis directions, which differences are equal to or less than the predetermined allowable values ($\Delta x$, $\Delta y$, $\Delta z$), and thus regarded as belonging to the same group.

Subsequently, one of the candidate areas formed at S130 is extracted (S140). Then, it is determined whether or not the size (W, H) of the extracted candidate area is larger than a size defined by specified values ($Th_W$, $TH_H$) indicating one size of predetermined objects to be detected (e.g., preceding vehicle) (hereinafter referred to as "detection objects") (S150).

As a result of the determination at S150, if the size (W, H) of the candidate area is not more than the size defined by the specified values ($Th_W$, $TH_H$) (NO at S150), the candidate area extracted at S140 is determined as having a low probability of including more than one detection object. Then, control proceeds to S220.

On the other hand, as a result of the determination at S150, if the size (W, H) of the candidate area is larger than the size defined by the specified values ($Th_W$, $TH_H$) (YES at S150), the candidate area extracted at S140 is determined as having a probability of including more than one detection object (hereinafter, this candidate area is referred to as so "special candidate area"). Then, control proceeds to S160.

Figure 3A:
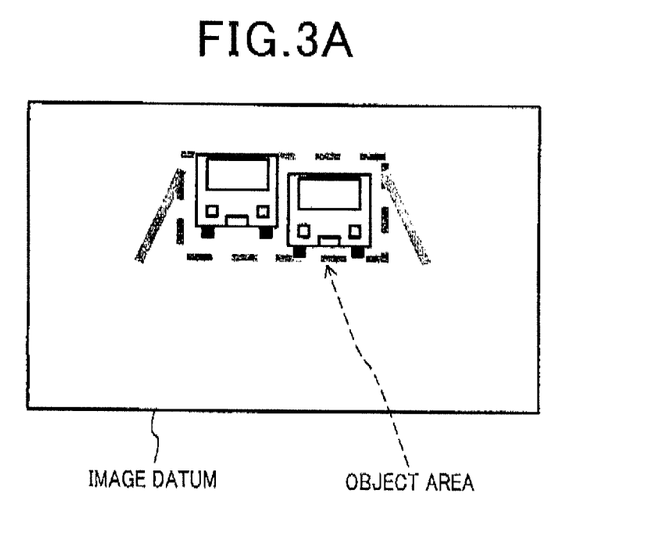
FIGS. 3A and 3B are explanatory diagrams illustrating how objects to be detected are detected from an image datum in the object recognition process.
Figure 3B:
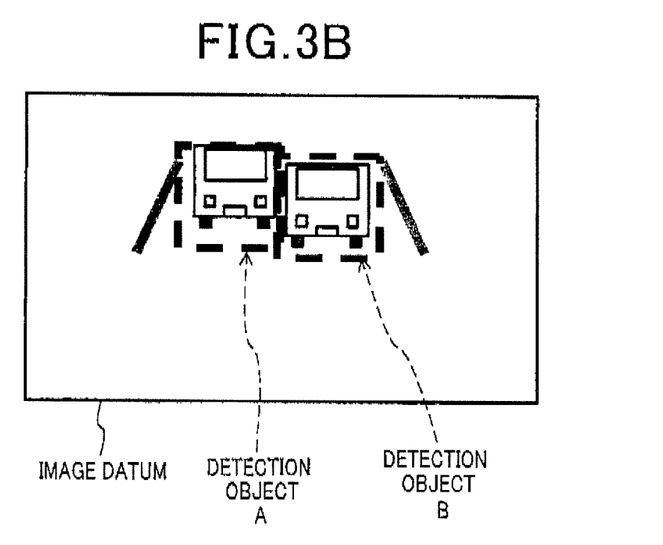

FIGS. 3A and 3B are explanatory diagram illustrating how a detection object is detected from an image datum in the object recognition process.

At S160, as shown in FIG. 3A, in an image datum acquired at S110, an object area is defined that is an area in the image datum and corresponding to the special candidate area. Subsequently, an image s recognition process is performed for the object area defined in the image datum, by making a comparison with identifiers that indicate detection objects (S170).

Specifically, at S170, using a well-known scheme, a predetermined feature amount is derived from the object area in the image datum and the derived feature amount is compared with the identifiers. Thus, as shown in FIG. 3B, all the detection objects picked up from the object area in the image datum are detected to define the ranges (detection object A and detection object B in FIG. 3B) in which the respective detection objects are present.

Then, it is determined whether or not the detection object (hereinafter referred to as "detection entity") detected from the object area in the image datum is more than one (S180). As a result of the determination at S180, if the detection entity is not more than one, i.e. the number of entities is "0" or "1" (NO at S180), control proceeds to S220 which will be described later.

On the other hand, as a result of the determination at S180, if the detection entity is more than one (i.e. the number of the entities is "2" or more) (YES at S180), control proceeds to S190. At S190, an object border is derived from the object area in the image datum. The object border corresponds to a coordinate in the image datum, which indicates a border between object entities. Further, the object border is converted to a border direction (corresponding to the border location of the present invention) in terms of the scan angle θx, y in a measured-distance datum (S200).

Then, the special candidate area is divided using the border direction resulting from the conversion (S210), and then control returns to S150. At S150, it is determined whether or not the size (W, H) of each division of the special candidate area divided at S210 is larger than the size defined by the specified values ($Th_W$, $TH_H$). If the size (W, H) of each division of the special candidate area is larger than the size defined by the specified values ($Th_W$, $TH_H$) (YES at S150), the processings at S160 to S210 are repeated. Specifically, the processings S150 to S210 are repeated until there is no probability that more than one detection object is present in the special candidate area.

On the other hand, if the size (W, H) of each division of the special candidate area is equal to or smaller than the size defined by the specified values ($Th_W$, $TH_H$) (NO at S150), each division of the special candidate area is treated as a new candidate area, and control proceeds to S220.

At S220, it is determined whether or not the determination at S150 has been made regarding all of the candidate areas. If the determination at S150 has not been made regarding all of the candidate areas (NO at S220), control returns to S140. Then, at S140, a candidate area that has not been subjected to the determination at S150 is extracted from among all of the candidate areas to repeat the steps of S150 to S220.

On the other hand, if the determination at S150 has been made regarding all of the candidate areas (YES at S220), control proceeds to S230.

At S230, each of the candidate areas is regarded as an observation value and traced in a time-series manner. Then, according to the results of the tracing, the type of the object is defined and recognized for each of the observation values. Meanwhile, a tracing process is performed to generate object data for each of the recognized objects.

Since the tracing process is well known, specific description is omitted here. However, in a generally performed tracing process, a relative speed between the vehicle concerned and the object is derived from the time-series change of the location of the observation value (i.e. candidate area). Then, the derived relative speed is compared with the vehicle speed of the vehicle concerned. After that, the type of the object is assumed based on the results of the comparison and the size of the observation value (i.e. candidate area). Further, using a Kalman filter, time-series behaviors of the observation value (i.e. candidate area) are predicted. If the results of the prediction match the observation value, the type, size, speed and the like of the assumed object are finally confirmed. Then, the confirmed results are generated as object data.

After that, the object recognition process is ended, and control stands by until the subsequent start timing.

Hereinafter is described an example of operation of the object recognition system 1 according to the present embodiment.

Figure 4A:
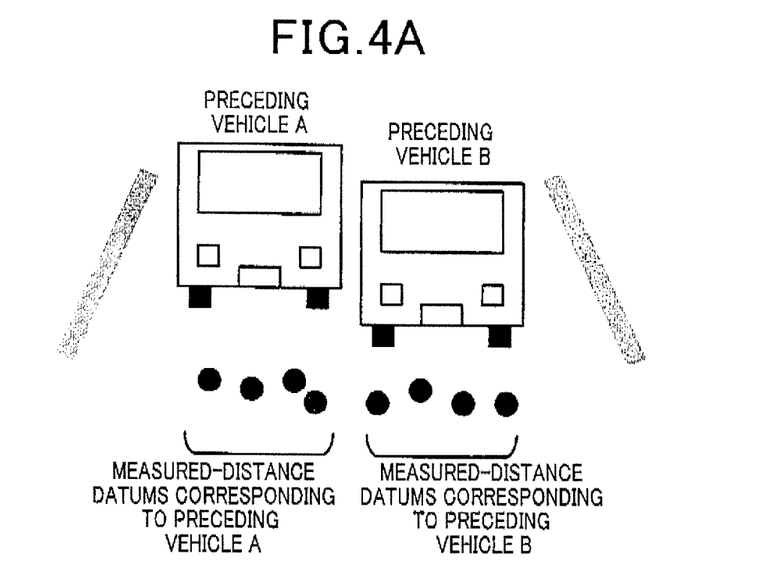
FIGS. 4A to 4C are explanatory diagrams illustrating an example of operation according to the embodiment.
Figure 4B:
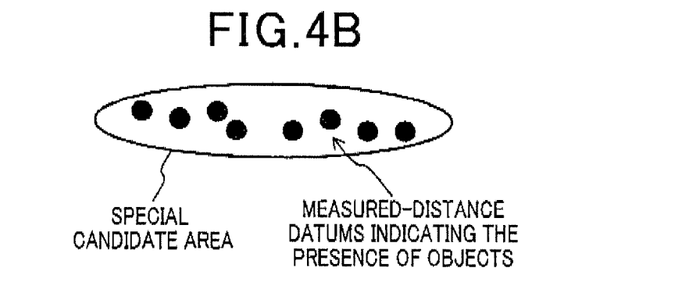
Figure 4C:
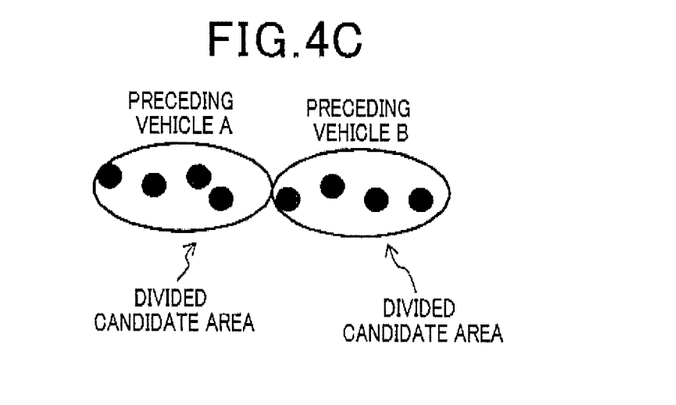

FIGS. 4A to 4C are explanatory diagrams illustrating the example of operation. Let us assume a case as shown in FIG. 4A. Specifically, in FIG. 4A, preceding vehicles A and B are traveling ahead of the vehicle concerned. The distances from the vehicle concerned to the preceding vehicles A and B are the same (i.e., the difference in the distance in the Z-axis direction is not more than the allowable value Δz). Also, end portions of the preceding vehicles (i.e. the right end of the preceding vehicle A and the left end of the preceding vehicle B) are close to each other. In this case, let us assume, further, that the actual distance between the end portion (right end) of the preceding vehicle A and the end portion (left end) of the preceding vehicle B in the widthwise direction is larger than the allowable value Δx.

In the above assumed case as well, the laser beam emitted from the light emitter 20 of the lidar system 10 will be scattered. Therefore, the difference in the widthwise direction between the measured-distance datum (R, θx, y) corresponding to the end portion (right end) of the preceding vehicle A and the measured-distance datum (R, θx, y) corresponding to the end portion (left end) of the preceding vehicle B will be less than the allowable value Δx. Then, the processing at S130 of the object recognition process of the present embodiment will result in as shown in FIG. 4B. Specifically, the measured-distance datums corresponding to the preceding vehicle A and the measured-distance datums corresponding to the preceding vehicle B are grouped as one candidate area. In this case, assuming an object to be detected is a vehicle (preceding vehicle), the size (W, H) of the candidate area is larger than the size defined by the specified values ($Th_W$, $TH_H$). Therefore, at S160 and S170 of the object recognition process, the candidate area is treated as a special candidate area. Then, an object area corresponding to the special candidate area in the image datum is subjected to the image recognition process to thereby define a range of the detection object (i.e., the preceding vehicles A and B) in the object area.

Then, as shown in FIG. 4C, at step S200 of the object recognition process, the special candidate area is divided according to the border direction of the detection objects, which is based on the range of the detection object defined above. The divisions of the special candidate area are then treated as new candidate areas. Further, at S230 of the object recognition process, the tracing process is performed for all the candidate areas to define objects in the candidate areas, which are to be confirmed as objects.

As described above, according to the object recognition process of the present embodiment, when the candidate area is a special candidate area, the special candidate area is divided into areas corresponding to individual objects.

As a result, under the condition where more than one detection object is adjacently present along the scan direction, the object recognition system 1 is able to recognize all of the detection objects as individual detection objects, whereby the accuracy of recognizing a detection object is enhanced.

In the object recognition process according to the present embodiment, it is determined whether or not a special candidate area can be divided on a object-by-object basis, until the size of each of candidate areas that would result from the division of the special candidate area turns out to be a size equal to or less than the size defined by the specified values. Therefore, according to the object o recognition system 1, each of all the detection objects contained in a special candidate area is more reliably recognized as a single detection object.

Further, in the object recognition system 1, time-series tracing is performed regarding the locations of the individual detection objects. Accordingly, the behaviors of the detection objects are recognized with good accuracy.

In the object recognition process according to the present embodiment, the area in an image datum subjected to the image recognition process is limited to an object area corresponding to a special candidate area. As a result, according to the object recognition system 1, the amount of processing is reduced which is required for detecting the locations of the detection objects in an image datum. Thus, according to the object recognition system 1, the time taken for detecting detection objects is shortened.

(Modifications)

An embodiment of the present invention has been described so far. However, the present invention is not limited to the embodiment described above, but may be implemented in various modes within a scope not departing from the spirit of the present invention.

Some modifications of the present invention are described below. It should be appreciated that the components identical with or similar to those in the above embodiment are given the same reference numerals for the sake of omitting explanation.

For example, the object recognition system 1 in the above embodiment has included the lidar system 10, the imaging unit 40 and the recognition ECU 50. However, the object recognition system 1 is not limited to have such a configuration, but may exclude the recognition ECU 50.

Figure 5:
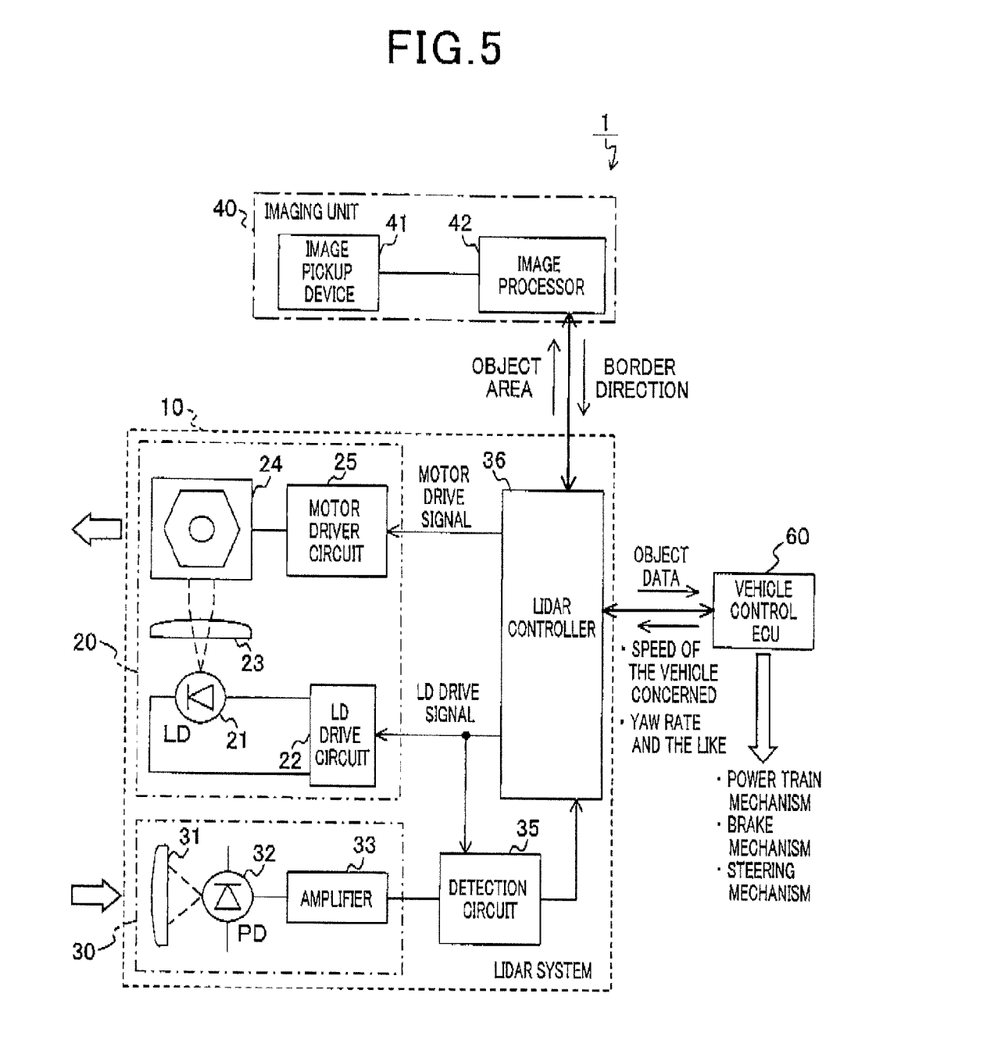
FIG. 5 is a schematic block diagram illustrating the configuration of an object recognition system according to a modification of the present invention.

FIG. 5 is a schematic block diagram illustrating the configuration of the object recognition system 1 according to a modification of the present invention. As shown in FIG. 5, the object recognition system 1 may be configured only by the lidar system 10 and the imaging unit 40. In this configuration, information (e.g., object area and border direction) may be exchanged between the lidar controller 36 of the lidar system 10 and the image processor 42 of the imaging unit 40.

Figure 6:
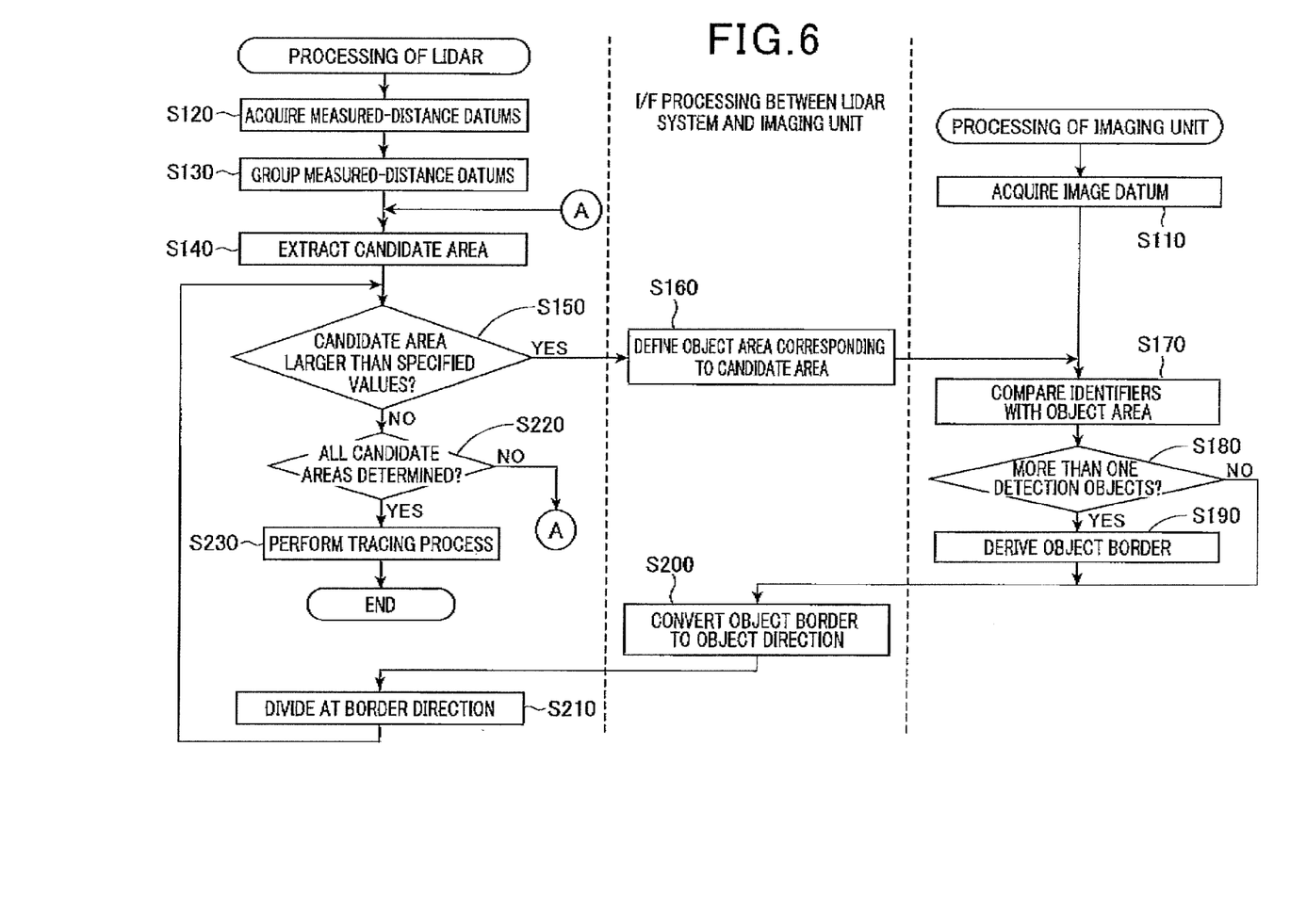
FIG. 6 is a flow diagram illustrating the processing procedure of an object recognition process performed by the object recognition system according to the modification.

FIG. 6 is a flow diagram illustrating the procedure of an object recognition process performed by the object recognition system 1 according to the modification. As shown in FIG. 6, when the object recognition system 1 has the configuration as mentioned above, it is desirable that the lidar controller 36 of the lidar system 10 performs the steps of S120 to S150 and S210 to S230. Meanwhile, it is desirable that the image processor 42 of the imaging unit 40 performs the steps of S110 and S170 to S190. The steps of S160 and S200 in the object recognition process may be performed by the lidar controller 36 of the lidar system 10, or by the image processor 42 of the imaging unit 40.

However, the lidar system 10 and the imaging unit 40 in the present modification have configurations similar to those of the lidar system 10 and the imaging unit 40 of the above embodiment. Also, the individual steps of the object recognition process in the present modification have contents similar to those of the individual steps in the above embodiment.

At step S170 of the object recognition process in the above embodiment, the area in an image datum subjected to the image recognition process has been limited to an object area. However, the area in an image datum subjected to the image recognition process at step S170 is not limited to an object area but may be, for example, the entire area of the image datum. In this case, S160 of the object recognition process may be omitted.

In the object recognition process in the embodiment described above, preceding vehicles have been the detection objects. However, the detection objects that can be detected in the abject recognition process are not limited to preceding vehicles. For example, the detection objects may be traffic signs on a road or roadside objects, such as a delineator, or may be objects, such as pedestrians or fallen objects, that would prevent driving of the vehicle.

When traffic signs on a road are included as detection objects, a preceding vehicle and a traffic sign on the road can be recognized as separate candidate areas, under the condition where the traffic sign resides immediately above the preceding vehicle and is very closely located to the preceding vehicle.

Finally, the relationships between the above embodiment and the claims are explained.

Step S110 of the object recognition process of the above embodiment corresponds to the image acquiring means of the present invention. Likewise, step S120 corresponds to the location acquiring means, and step S130 corresponds to the candidate detecting means. Further, steps S140 to S170 correspond to the range detecting means, and step S210 corresponds to the candidate dividing means.

Steps S150 to S170 after the processing at step S210 correspond to the re-detecting means.

What is claimed is:

1. An object recognition apparatus that recognizes presence of an object to be detected based on the results of sequentially emitting probe waves along a predetermined scan direction so that the probe waves are adjacently juxtaposed, the apparatus comprising:

location acquiring means that acquires a measured-distance datum indicating the location of an object, the measured-distance datum being generated for each emission of the probe wave based on a reflected wave from the object, the reflected wave being obtained as a result of emitting the probe wave;

image acquiring means that acquires an image datum that is an image of an area at least including a scan area of the probe waves;

candidate detecting means that detects a candidate area in which measured-distance datums are grouped as belonging to the same group, based on the measured-distance datums acquired by the location acquiring means, the grouped measured-distance datums being included in an area formed by those measured-distance datums which are spaced apart by a distance of not more than a predetermined allowable value;

special candidate area determining means that determines a special candidate area in the candidate area detected by the candidate detecting means, the special candidate area having a probability of including at least two or more objects to be detected which are adjacently located along a predetermined direction;

range detecting means that recognizes an object by subjecting the image datum acquired by the image acquiring means to an image recognition process and detects a range of measured-distance datums in which the objects to be detected reside, the objects being imaged in an area on the image datum, the area corresponding to the special candidate area; and candidate dividing means that divides the special candidate area at a border position between objects, the border position corresponding to an end of the range of the measured-distance datums detected by the range detecting means.

2. The object recognition apparatus according to claim 1, wherein:
the range detecting means performs the image recognition process for an area in the image datum, the area corresponding to the special candidate area.

3. The object recognition apparatus according to claim 2, wherein:
the range detecting means determines the candidate area as being the special candidate area if the candidate area has a size larger than a specified value that indicates the size of a unit body of each of the objects to be detected.

4. The object recognition apparatus according to claim 3, wherein:
the apparatus comprises re-detecting means that allows the range detecting means to detect a range of the measured-distance datums, using the group of measured-distance datums as the special candidate area, if the group of measured-distance datums has a size larger than the specified value, the group of measured-distance datums resulting from the division performed by the candidate dividing means.

5. The object recognition apparatus according to claim 4, wherein:
the apparatus emits the probe waves using at least a vehicle's widthwise direction as one of the scan directions; and
the range detecting means defines the special candidate area in which the vehicle's widthwise direction is used as the predetermined direction.

6. The object recognition apparatus according to claim 5, wherein:
the apparatus emits the probe waves using at least a vehicle's heightwise direction as one of the scan directions; and
the range detecting means defines the special candidate area in which the vehicle's heightwise direction is used as the predetermined direction.

7. The object recognition apparatus according to claim 1, wherein:
the range detecting means determines the candidate area as being the special candidate area if the candidate area has a size larger than a specified value that indicates the size of a unit body of each of the objects to be detected.

8. The object recognition apparatus according to claim 7, wherein:

the apparatus comprises re-detecting means that allows the range detecting means to detect a range of the measured-distance datums, using the group of measured-distance datums as the special candidate area, if the group of measured-distance datums has a size larger than the specified value, the group of measured-distance datums resulting from the division performed by the candidate dividing means.

9. The object recognition apparatus according to claim 8, wherein:
the apparatus emits the probe waves using at least a vehicle's widthwise direction as one of the scan directions; and
the range detecting means defines the special candidate area in which the vehicle's widthwise direction is used as the predetermined direction.

10. The object recognition apparatus according to claim 9, wherein:
the apparatus emits the probe waves using at least a vehicle's heightwise direction as one of the scan directions; and
the range detecting means defines the special candidate area in which the vehicle's heightwise direction is used as the predetermined direction.

11. The object recognition apparatus according to claim 1, wherein:
the apparatus comprises re-detecting means that allows the range detecting means to detect a range of the measured-distance datums, using the group of measured-distance datums as the special candidate area, if the group of measured-distance datums has a size larger than the specified value, the group of measured-distance datums resulting from the division performed by the candidate dividing means.

12. The object recognition apparatus according to claim 11, wherein:
the apparatus emits the probe waves using at least a vehicle's widthwise direction as one of the scan directions; and
the range detecting means defines the special candidate area in which the vehicle's widthwise direction is used as the predetermined direction.

13. The object recognition apparatus according to claim 12, wherein:
the apparatus emits the probe waves using at least a vehicle's heightwise direction as one of the scan directions; and
the range detecting means defines the special candidate area in which the vehicle's heightwise direction is used as the predetermined direction.

14. The object recognition apparatus according to claim 1, wherein:
the apparatus emits the probe waves using at least a vehicle's widthwise direction as one of the scan directions; and
the range detecting means defines the special candidate area in which the vehicle's widthwise direction is used as the predetermined direction.

15. The object recognition apparatus according to claim 14, wherein:
the apparatus emits the probe waves using at least a vehicle's heightwise direction as one of the scan directions; and
the range detecting means defines the special candidate area in which the vehicle's heightwise direction is used as the predetermined direction.

16. The object recognition apparatus according to claim 1, wherein:
- the apparatus emits the probe waves using at least a vehicle's heightwise direction as one of the scan directions; and
- the range detecting means defines the special candidate area in which the vehicle's heightwise direction is used as the predetermined direction.

17. A non-transitory computer-readable medium storing therein a program for allowing a computer to function as an object recognition apparatus that recognizes presence of an object to be detected based on the results of sequentially emitting probe waves along a predetermined scan direction so that the probe waves are adjacently juxtaposed, the program allowing the computer to perform:
- a location acquiring step that acquires a measured-distance datum indicating the location of an object, the measured-distance datum being generated for each emission of the probe wave based on a reflected wave from the object, the reflected wave being obtained as a result of emitting the probe wave;
- an image acquiring step that acquires an image datum that is an image of an area at least including a scan area of the probe waves;
- a candidate detecting step that detects a candidate area in which measured-distance datums are grouped as belonging to the same group, based on the measured-distance datums acquired by the location acquiring procedure, the grouped measured-distance datums being included in an area formed by those measured-distance datums which are spaced apart by a distance of not more than a predetermined allowable value;
- a special candidate area determining step that determines a special candidate area in the candidate area detected by the candidate detecting procedure, the special candidate area having a probability of including at least two or more objects to be detected which are adjacently located along a predetermined direction;
- a range detecting step that recognizes an object by subjecting the image datum acquired by the image acquiring procedure to an image recognition process and detects a range of measured-distance datums in which the objects to be detected reside, the objects being imaged in an area on the image datum, the area corresponding to the special candidate area; and
- a candidate dividing step that divides the special candidate area at a border position between objects, the border position corresponding to an end of the range of the measured-distance datums detected by the range detecting procedure.

18. A method, implemented in a object recognition apparatus including at least a processor, of recognizing presence of an object to be detected based on the results of sequentially emitting probe waves along a predetermined scan direction so that the probe waves are adjacently juxtaposed, the method comprising:
- acquiring, by location acquiring means of the object recognition apparatus, a measured-distance datum indicating the location of an object, the measured-distance datum being generated for each emission of the probe wave based on a reflected wave from the object, the reflected wave being obtained as a result of emitting the probe wave;
- acquiring, by image acquiring means of the object recognition apparatus, an image datum that is an image of an area at least including a scan area of the probe waves;
- detecting, by candidate detecting means of the object recognition apparatus, a candidate area in which measured-distance datums are grouped as belonging to the same group, based on the measured-distance datums acquired, the grouped measured-distance datums being included in an area formed by those measured-distance datums which are spaced apart by a distance of not more than a predetermined allowable value;
- determining, by special candidate area determining means of the object recognition apparatus, a special candidate area in the candidate area detected by the candidate detecting means, the special candidate area having a probability of including at least two or more objects to be detected which are adjacently located along a predetermined direction;
- recognizing, by range detecting means of the object recognition apparatus, an object by subjecting the acquired image datum to an image recognition process such that a range of measured-distance datums is detected in which the objects to be detected reside, the objects being imaged in an area on the image datum, the area corresponding to the special candidate area; and
- dividing, by candidate dividing means of the object recognition apparatus, the special candidate area at a border position between objects, the border position corresponding to an end of the range of the detected measured-distance datums.

\* \* \* \* \*